United States Patent
Kim et al.

(10) Patent No.: US 9,498,904 B2
(45) Date of Patent: Nov. 22, 2016

(54) MOLDING PROCESS OF HIGHLY HEAT-RESISTANT SOUND ABSORBING AND INSULATING MATERIALS

(71) Applicants: Hyundai Motor Company, Seoul (KR); Kia Motors Corporation, Seoul (KR)

(72) Inventors: Keun Young Kim, Gyeonggi-Do (KR); Won Jin Seo, Gyeonggi-Do (KR); Jong Beom Seo, Seoul (KR); Chi Man Cho, Gyeonggi-Do (KR); Ki Dong Lee, Gyeonggi-Do (KR); Su Nam Lee, Gyeonggi-Do (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 0 days.

(21) Appl. No.: 14/705,581

(22) Filed: May 6, 2015

(65) Prior Publication Data

US 2015/0352758 A1  Dec. 10, 2015

Related U.S. Application Data

(63) Continuation of application No. PCT/KR2013/010026, filed on Nov. 6, 2013.

(30) Foreign Application Priority Data

Nov. 6, 2012 (KR) .......................... 10-2012-0124955

(51) Int. Cl.
| | | |
|---|---|---|
| F02B 77/13 | (2006.01) |
| B29C 43/52 | (2006.01) |
| B29C 44/12 | (2006.01) |
| G10K 11/16 | (2006.01) |
| B29C 44/10 | (2006.01) |
| B29C 33/58 | (2006.01) |
| B29C 43/14 | (2006.01) |
| D04H 1/488 | (2012.01) |
| G10K 11/162 | (2006.01) |
| B60R 13/08 | (2006.01) |
| B29K 105/04 | (2006.01) |
| B29K 105/12 | (2006.01) |
| B29K 63/00 | (2006.01) |
| B29L 31/00 | (2006.01) |
| B29K 101/10 | (2006.01) |

(52) U.S. Cl.
CPC ............... *B29C 43/52* (2013.01); *B29C 33/58* (2013.01); *B29C 43/14* (2013.01); *B29C 44/10* (2013.01); *B29C 44/1266* (2013.01); *B60R 13/0876* (2013.01); *D04H 1/488* (2013.01); *G10K 11/16* (2013.01); *G10K 11/162* (2013.01); *B29C 2043/141* (2013.01); *B29K 2063/00* (2013.01); *B29K 2101/10* (2013.01); *B29K 2105/04* (2013.01); *B29K 2105/12* (2013.01); *B29K 2277/10* (2013.01); *B29K 2995/0002* (2013.01); *B29K 2995/0015* (2013.01); *B29K 2995/0016* (2013.01); *B29K 2995/0017* (2013.01); *B29L 2031/721* (2013.01); *Y10T 29/49572* (2015.01)

(58) Field of Classification Search
CPC ......................................................... F02B 77/13
USPC .................................. 181/290, 284, 286, 204
See application file for complete search history.

(56) References Cited

U.S. PATENT DOCUMENTS

| | | | |
|---|---|---|---|
| 5,945,643 A * | 8/1999 | Casser .................. | B29C 70/086 181/208 |
| 6,651,726 B2 | 11/2003 | Suzuki et al. | |
| 8,393,438 B2 * | 3/2013 | Ogawa .................... | B32B 5/26 181/286 |
| 8,997,925 B2 | 4/2015 | Kim et al. | |
| 2002/0011691 A1 | 1/2002 | Suzuki et al. | |
| 2003/0066708 A1 * | 4/2003 | Allison ..................... | B32B 5/18 181/290 |

| | | | |
|---|---|---|---|
| 2004/0169373 A1* | 9/2004 | Wolaver | F01N 1/24 290/1 A |
| 2009/0056668 A1* | 3/2009 | Hazelton | F02B 77/13 123/198 E |
| 2010/0065366 A1* | 3/2010 | Soltau | G10K 11/168 181/286 |
| 2010/0122870 A1* | 5/2010 | Fonville | F02B 77/13 181/294 |
| 2015/0283960 A1* | 10/2015 | Kim | B60R 13/0838 264/103 |

FOREIGN PATENT DOCUMENTS

| | | |
|---|---|---|
| CN | 101153428 A | 4/2008 |
| CN | 101601085 A | 12/2009 |
| EP | 1621408 A1 | 2/2006 |
| JP | 2002-287767 A | 10/2002 |
| JP | 2003-201658 A | 7/2003 |
| JP | 2003-293256 A | 10/2003 |
| JP | 2012-086838 | 5/2012 |
| KR | 10-0241133 | 11/1999 |
| KR | 10-2006-0003276 | 1/2006 |
| KR | 10-2006-0013468 | 2/2006 |
| KR | 10-2007-0046019 A | 5/2007 |
| KR | 10-0832358 | 5/2008 |
| KR | 10-2011-0055009 | 5/2011 |
| KR | 10-2011-0102077 | 9/2011 |
| WO | 98/30375 A1 | 7/1998 |
| WO | 2004/107314 A1 | 12/2004 |
| WO | 2012/008473 A1 | 1/2012 |
| WO | 2012/101192 A1 | 8/2012 |

OTHER PUBLICATIONS

International Search Report dated Jan. 28, 2014 for PCT/KR/2013/010026.

* cited by examiner

*Primary Examiner* — Forrest M Phillips

(74) *Attorney, Agent, or Firm* — Mintz Levin Cohn Ferris Glovsky and Popeo, P.C.; Peter F. Corless

(57) ABSTRACT

The present invention relates to a method for molding a substantially improved heat-resistant sound absorbing and insulating material, which uses a sound absorbing material containing, based on 100 parts by weight of the sound absorbing material, an amount of about 20-80 parts by weight of a fiber material having a limiting oxygen index (LOI) of about 25% or greater and a heat resistance temperature of about 200° C. or greater and an amount of about 20-80 parts by weight of a thermosetting binder resin having a heat resistance temperature of about 200° C. or greater and is installed on an engine cylinder block and an automotive body panel above a muffler of a vehicle. The method includes: a releasing agent coating step of coating a releasing agent inside a heated die; a heated compression molding step of fixing a shape; and a cold compression step of stabilizing the shape.

The substantially improved heat-resistant sound absorbing and insulating material molded according to the method can reduce the noise inside a vehicle by blocking radiated noise, which is generated from an engine and an exhaust system, from being transferred to the inside of the vehicle through an automotive body panel, can maintain its shape even under a high-temperature environment of about 200° C. or greater generated by the engine and the exhaust system, and can satisfy UL 94V-0 flame retardancy.

18 Claims, 9 Drawing Sheets

MOLDING PROCESS OF HIGHLY HEAT-RESISTANT SOUND ABSORBING AND INSULATING MATERIALS

CROSS-REFERENCE TO RELATED APPLICATIONS

This application claims the benefit of International Application No.: PCT/KR2013/010026 filed Nov. 6, 2013, which also claims the benefit of Korean Patent Application No. 10-2012-0124955, filed on Nov. 6, 2012, the entire contents of both applications are incorporated herein by reference.

TECHNICAL FIELD

The present invention relates to a method for molding a highly heat-resistant sound absorbing and insulating material, which uses a sound absorbing material containing, based on 100 parts by weight of the sound absorbing material, an amount of about 20-80 parts by weight of a fiber material having a limiting oxygen index (LOI) of about 25% or greater and a heat resistance temperature of about 200° C. or greater and an amount of about 20-80 parts by weight of a thermosetting binder resin having a heat resistance temperature of about 200° C. or greater, and may be particularly installed on an engine cylinder block and an automotive body panel above a muffler of a vehicle. Further, the method for molding the highly heat-resistant sound absorbing may include a releasing agent coating step of coating a releasing agent inside a heated die, a heated compression molding step of fixing a shape, and a cold compression step of stabilizing the shape.

BACKGROUND

Various noises are generated while driving a vehicle. The vehicle noise may be mainly generated from an engine or an exhaust system and may be transferred to the inside of a vehicle by air. A sound absorbing and insulating material has been used to reduce the noise generated from the engine and the exhaust system from being transferred to the inside of the vehicle. For example, an insulation dash, a dash isolation pad and the like have been used to block the noise radiating from the engine from being transferred to the inside of the vehicle, and a tunnel pad, a floor carpet and the like have been used to block the noise generated from the exhaust system and the floor from being transferred to the inside of the vehicle.

In the related arts, as sound absorbing materials for a vehicle, Korean Patent Publication No. 2004-0013840 discloses a 20-mm thick sound absorbing and insulating material having a PET fiber layer in which a synthetic resin film layer having a thickness of about 40-100 μm in the lengthwise direction is inserted, and Korean Patent Publication No. 2002-0089277 discloses a process for preparing a sound absorbing insulation material of a nonwoven form by cutting and beating a polyester fiber and an acrylic fiber, mixing with a low-melting-point polyester fiber at a specific ratio, and molding and heating the same. And, Korean Patent Publication No. 2006-0043576 discloses a method of coating at least one of a top layer and a bottom layer of a polyester (PET) felt with a resin, using a mixture fiber of a low-melting-point fiber (LMF) and a regular fiber.

However, for the existing insulation dash and insulation hood, although a resin felt using phenol powder as a binder, or a glass wool or semicrystalline polyurethane foam product using a phenol resin as a binder can be molded simply by a heated compression molding process within 60 seconds, they cannot maintain their shape under a high-temperature environment of 200° C. or greater or do not have superior flame retardancy. For this reason, they cannot be directly installed on an engine cylinder block or an automotive body panel above a muffler.

Further, a dash isolation pad, a tunnel pad and a floor carpet using a low-melting-point polyethylene terephthalate (LM-PET) fiber, which is a thermoplastic binder, have poor flame retardancy. Although a thermosetting binder resin having a heat resistance temperature of 200° C. or greater has to be used for direct installation on an engine cylinder block or an automotive body panel above a muffler, product molding is impossible through pre-heating followed by cold compression molding.

The description provided above as a related art of the present invention is just merely for helping understanding of the background of the present invention and should not be construed as being included in the related art known by those skilled in the art.

SUMMARY

In preferred aspects, the present invention provides a method for molding a substantially improved heat-resistant sound absorbing and insulating material which may not change in shape under a high-temperature environment of about 200° C. or greater as being adjacent to the noise source of an engine or an exhaust system, and may satisfy UL 94V-0 flame retardancy.

The present invention further provides a method for reducing noise by applying the sound absorbing and insulating material to a noise generating device.

In one aspect, the present invention provides a method for molding a substantially improved heat-resistant sound absorbing and insulating material. The method may include: i) coating a releasing agent inside a heated die; ii) forming a shape of a sound absorbing material by installing a sound absorbing material containing a) an amount of about 20-80 parts by weight of a fiber material based on 100 parts by weight of the sound absorbing material and b) an amount of about 20-80 parts by weight of a thermosetting binder resin based on 100 parts by weight of the sound absorbing material on the heated die coated with the releasing agent; and iii) stabilizing the shape of the compressed sound absorbing material. In particular, the fiber material may have a limiting oxygen index (LOI) of about 25% or greater and a heat resistance temperature of about 200° C. or greater, and the thermosetting binder resin may have a heat resistance temperature of about 200° C. or greater.

The term "limiting oxygen index (LOI)", as used herein, indicates the minimum concentration of oxygen, expressed as a percentage, that will support combustion of a polymer or material. The LOT may be typically measured by passing a mixture of oxygen and nitrogen over a burning specimen of the polymer or material, and reducing the oxygen level until a critical level is reached. The LOI values for different polymers or materials may be readily determined by such a procedure including standardized tests, such as the ISO 4589 and ASTM D2863.

In an exemplary embodiment of the present invention, in the step i), a spray-up type releasing agent may be prepared by diluting an emulsion with water to a concentration of 10-90% (vol/vol), and then may be uniformly coated onto top and bottom surfaces inside the heated die in an amount of about 20-100 g/m$^2$.

In another exemplary embodiment of the present invention, the emulsion may be one or more selected from the group consisting of a silicon-based emulsion and a fluorine-based emulsion.

In an exemplary embodiment of the present invention, in the step ii), the sound absorbing material may be installed on the heated die coupled with a heated press and hot compression may be performed at a pressure of about 60-200 kgf/cm² for about 60-300 seconds with the surface temperature of the heated die maintained at a temperature of about 150-230° C. to fix its shape.

In another exemplary embodiment of the present invention, the sound absorbing material may include: a nonwoven fabric containing a fiber material and a thermosetting binder resin which may be located in the same layer as the nonwoven fabric and may be impregnated in the nonwoven fabric while maintaining a three-dimensional structure inside the nonwoven fabric, such that the thermosetting binder resin may be distributed uniformly on the entire fiber yarn of the nonwoven fabric and forming vent holes or microcavities therein which are reduced in size as compared to before the impregnation of the binder.

In another exemplary embodiment of the present invention, the sound absorbing material may be prepared by immersing the nonwoven fabric in a thermosetting binder resin solution, compressing at a pressure of about 1-20 kgf/cm².

In another exemplary embodiment of the present invention, the sound absorbing material may be one in which an amount of about 1-300 parts by weight of the thermosetting binder resin is impregnated based on 100 parts by weight of the nonwoven fabric.

In another exemplary embodiment of the present invention, the fiber material may be one or more selected from the group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

In another exemplary embodiment of the present invention, the fiber material may be one or more selected from the group consisting of a meta-aramid (m-aramid) fiber and a para-aramid (p-aramid) fiber.

In another exemplary embodiment of the present invention, the nonwoven fabric may be a single-layer nonwoven fabric formed of an aramid fiber having a fineness of about 1-15 denier and a thickness of about 3-20 mm.

In another exemplary embodiment of the present invention, the nonwoven fabric may have a density of about 100-2000 g/m².

In another exemplary embodiment of the present invention, the thermosetting binder resin may contain an epoxy resin, an amount of about 1-20 wt % of a curing agent based on the weight of the epoxy resin, an amount of about 1-10 wt % of a catalyst based on the weight of the epoxy resin and an amount of about 10-40 wt % of a flame retardant based on the weight of the epoxy resin.

In another exemplary embodiment of the present invention, the epoxy resin may be one or more selected from the group consisting of bisphenol A diglycidyl ether, bisphenol F diglycidyl ether, polyoxypropylene diglycidyl ether, phosphazene diglycidyl ether, phenol novolac epoxy, o-cresol novolac epoxy and bisphenol A novolac epoxy.

In an exemplary embodiment of the present invention, in the step iii), the sound absorbing material may be installed on a cold die coupled with one selected from the group consisting of a cold press and a compression jig and cold compression may be performed for about 5 seconds or greater with the surface temperature of the cold die maintained at a temperature of about 20-40° C.

In another exemplary embodiment of the present invention, the cold compression may be performed for about 30-60 seconds.

In another aspect, the present invention provides a method for reducing noise of a noise generating device, including: i) identifying the three-dimensional shape of a noise generating device; ii) molding a sound absorbing and insulating material by the method so as to correspond partially or entirely to the three-dimensional shape of the device; and iii) bringing the sound absorbing and insulating material adjacent to the noise generating device.

The term "shape" of the device, as used herein, means a distinctive form which is made or molded suitably by a suitable method used in the related arts without limitation. The shape may not be particularly limited, but the shape of the device may be formed at least a portion or entirely based on the design, without limitation. For example, the three-dimensional shape of a noise generation device of a vehicle may be molded or casted, without limited suitably by any methods generally used in the art, to provide a shape of the sound-absorbing molded material, thereby being used and attached at adjacent to the noise generation device.

In an exemplary embodiment of the present invention, the device may be a motor, an engine or an exhaust system.

In an exemplary embodiment of the present invention, said bringing the sound absorbing and insulating material adjacent to the noise generating device may include closely attaching the sound absorbing and insulating material to the noise generating device, entirely or at least a portion thereof, installing the sound absorbing and insulating material to be spaced apart from the noise generating device or molding the sound absorbing and insulating material as a part of the noise generating device.

Thus, the method for molding a substantially improved heat-resistant sound absorbing and insulating material according to exemplary embodiments of the present invention may provide a substantially improved heat-resistant sound absorbing and insulating material which may be installed adjacent to a noise generating source of an engine or an exhaust system thereby reducing noise radiating from the engine or the exhaust system.

Further provided is a vehicle part that comprises the substantially improved heat-resistant sound absorbing and insulating material manufactured by the methods described herein.

Other aspects are disclosed infra.

BRIEF DESCRIPTION OF THE DRAWINGS

The above and other objects, features and advantages of the present invention will be more clearly understood from the following detailed description taken in conjunction with the accompanying drawing.

FIG. 2A is an image of an exemplary nonwoven fabric prepared by needle punching. FIGS. 2B and 2C show images of binder-impregnated nonwoven fabrics. FIG. 2B is an exemplary image of an exemplary binder-impregnated nonwoven in which about 20 parts by weight of an exemplary thermosetting binder resin is impregnated in about 80 parts by weight of an exemplary nonwoven fabric, and FIG. 2C is an exemplary image of an exemplary binder-impregnated nonwoven fabric in which about 50 parts by weight of an exemplary thermosetting binder resin is impregnated in about 50 parts by weight of an exemplary nonwoven fabric.

FIG. 3A shows an image of an exemplary sound absorbing and insulating material molded for use in an exemplary vehicle engine, and FIG. 3B shows an image of an exemplary sound absorbing and insulating material installed on a part of an exemplary vehicle engine.

FIG. 4A shows an image of an exemplary sound absorbing and insulating material molded for use in a lower part of a vehicle, and FIG. 4B shows an image of an exemplary sound absorbing and insulating material installed on a lower part of a vehicle.

FIG. 5A shows a shape of a sound absorbing and insulating material molded in Example 1; FIG. 5B shows a shape of a sound absorbing and insulating material molded in Comparative Example 1; FIG. 5C shows a shape of a sound absorbing and insulating material molded in Comparative Example 2; FIG. 5D shows a shape of a sound absorbing and insulating material molded in Comparative Example 3; and FIG. 5E shows a shape of a sound absorbing and insulating material molded in Comparative Example 4.

DETAILED DESCRIPTION

Figure 1:
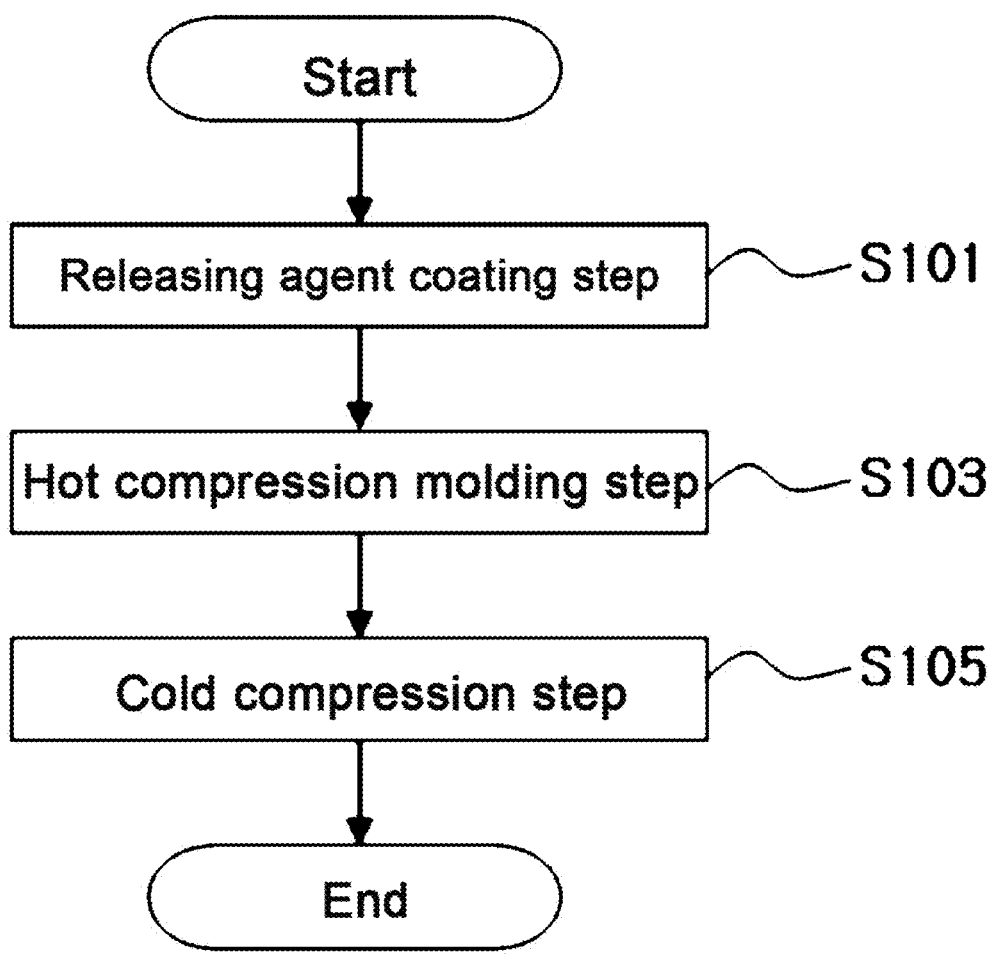
FIG. 1 shows a flow chart describing an exemplary method for molding a substantially improved heat-resistant sound absorbing and insulating material according to an exemplary embodiment of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, specific exemplary embodiments of the present invention will be described in detail. However, they are only intended to describe the present invention in detail such that those of ordinary skill in the art to which the present invention belongs can easily carry out the invention and the technical idea and scope of the present invention are not limited by them.

In one aspect, a method for molding a heat-resistant sound absorbing and insulating material is provided. The method may comprise: i) coating a releasing agent inside a heated die; ii) forming a shape of a sound absorbing material by installing a sound absorbing material comprising, based on 100 parts by weight of sound absorbing material, a) an amount of about 20-80 parts by weight of a fiber material having a limiting oxygen index (LOI) of about 25% or greater and a heat resistance temperature of about 200° C. or greater and b) an amount of about 20-80 parts by weight of a thermosetting binder resin having a heat resistance temperature of about 200° C. or greater on the heated die coated with the releasing agent; and iii) stabilizing the shape of the compressed sound absorbing material.

The method for molding a substantially improved heat-resistant sound absorbing and insulating material according to an exemplary embodiment of the present invention may include: a releasing agent coating step S101 of coating a releasing agent inside a heated die; a hot compression molding step S103 of fixing a shape of a sound absorbing material; and a cold compression step S105 of stabilizing the shape.

In the releasing agent coating step S101, a spray-up type may be uniformly coated onto top and bottom surfaces inside the heated die, particularly, in an amount of 20-100 g/m². The releasing agent, for example, may be prepared by diluting an emulsion with water to a concentration of 10-90% and may serve to prevent the substantially improved heat-resistant sound absorbing and insulating material from being attached to the heated die during molding. When the coating amount of the releasing agent is less than about 20 g/m², severe fluffing may occurs as the thus manufactured substantially improved heat-resistant sound absorbing and insulating material may be attached to the heated die. Further, when the coating amount of the releasing agent greater than about 100 g/m², the surface of the thus manufactured substantially improved heat-resistant sound absorbing and insulating material may be contaminated. Accordingly, the releasing agent may be coated in the above-described range. The exemplary emulsion may be, but not limited to, one or more selected from the group consisting of a silicon-based emulsion and a fluorine-based emulsion.

In the hot compression molding step S103, a sound absorbing material may be installed on the heated die which is coupled with heated press. The sound absorbing material may include an amount of about 20-80 parts by weight of a fiber material based on 100 parts by weight of the sound absorbing material and an amount of about 20-80 parts by weight of a thermosetting binder resin based on 100 parts by weight of the sound absorbing material. In particular, the fiber material may have a limiting oxygen index (LOI) of 25% or greater, and a heat resistance temperature of 200° C. or greater. The thermosetting binder resin may have a heat resistance temperature of about 200° C. or greater.

The hot compression molding may be performed at a pressure of about 60-200 kgf/cm$^2$ for about 60-300 seconds with the surface temperature of the heated die maintained at about 150-230° C. As a result, the shape of the substantially improved heat-resistant sound absorbing and insulating material may be fixed. When the surface temperature of the heated die is less than about 150° C., exfoliation may occur as the thermosetting binder resin existing in the core part of the substantially improved heat-resistant sound absorbing and insulating material may not be cured. Further, when the surface temperature of the heated die is greater than about 230° C., discoloration may occur due to the browning of the thermosetting binder resin, thereby causing a problem in appearance quality. When the pressure is less than about 60 kgf/cm$^2$, exfoliation may occur at the volume part of the substantially improved heat-resistant sound absorbing and insulating material. And, when the pressure is greater than about 200 kgf/cm$^2$, a problem in appearance quality may occur as the surface of the compressed part of the substantially improved heat-resistant sound absorbing and insulating material becomes slippery. When the hot compression time is less than about 60 seconds, exfoliation may occur as the thermosetting binder resin existing in the core part of the substantially improved heat-resistant sound absorbing and insulating material may not be cured. Further, when the hot compression time is greater than about 300 seconds, a problem in appearance quality may occur as discoloration occurs due to the browning of the thermosetting binder resin and as the surface of the compressed part of the substantially improved heat-resistant sound absorbing and insulating material may become slippery. Accordingly, the hot compression pressure, temperature, and time may be in the above-described ranges.

In the present invention, as a fiber material constituting the sound absorbing material, a heat-resistant fiber having a limiting oxygen index (LOI) of about 25% or greater and a heat resistance temperature of about 200° C. or greater may be particularly used. The heat-resistant fiber may be any one that has superior durability so as to endure high-temperature and ultra-high-temperature conditions. In particular, a heat-resistant fiber having a limiting oxygen index (LOI) of about 25-80% and a heat resistance temperature of about 200-3000° C. may be used. Further, a heat-resistant fiber having a limiting oxygen index (LOI) of about 25-70% and a heat resistance temperature of about 200-1000° C. may be used. The heat-resistant fiber may have a fineness of about 1-15 denier, or particularly of about 1-6 denier, and a yarn length of about 20-100 mm, or particularly of about 40-80 mm.

As the fiber material, one known as 'superfiber' in the related art may be used without limitation. Particularly, the superfiber may be one or more selected from the group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

Among other fibers, an aramid fiber may be preferably used as the heat-resistant fiber in the present invention. For example, a meta-aramid (m-aramid) fiber, a para-aramid (p-aramid) fiber or a mixture thereof may be used as the heat-resistant fiber in the present invention. The fiber material may be a base material of the substantially improved heat-resistant sound absorbing and insulating material and serve to reduce noise transferred to the inside of a vehicle by absorbing the noise radiating from an engine or an exhaust system.

Although a heat-resistant fiber as described above may be used as an exemplary fiber material constituting the sound absorbing material according to an exemplary embodiment of the present invention, any fiber used in this field may be used by as being included in addition to the yarn of the heat-resistant fiber for the purpose of cost reduction, weight decrease, functionality, and the like. In other words, although the sound absorbing material of the present invention may be prepared from a heat-resistant fiber as a yarn, it may not be limited to a sound absorbing material consisting only of a heat-resistant fiber. The heat-resistant fiber yarn included in the sound absorbing material of the present invention may be included in an amount of about 30-100 wt %, or particularly of about 60-100 wt %, based on the total weight of the fiber material.

In the present invention, a nonwoven fabric prepared by needle punching to have a thickness of about 3-20 mm and a density of about 100-2000 g/m$^2$ may be used as the fiber material. Sound-absorbing performance may vary depending on the thickness and density of the nonwoven fabric. As such, the sound-absorbing performance may be increased with increasing thickness and density of the nonwoven fabric. When considering the industrial application, and the like of the sound absorbing and insulating material of the present invention, the nonwoven fabric may have a thickness of about 3-20 mm. When the thickness of the nonwoven fabric is less than about 3 mm, the durability and moldability of the sound absorbing and insulating material may be unsatisfactory. And, when the thickness is greater than about 20 mm, productivity may decrease and production cost may increase during manufacturing and processing the nonwoven fabric. In addition, the density of the nonwoven fabric may be about 100-2000 g/m$^2$, 200-1200 g/m$^2$, or particularly of about 300-800 g/m$^2$, in the aspects of performance and cost. The nonwoven fabric may be formed by stacking a web of about 30-100 g/m$^2$ which may be formed by carding 2- to 12-fold and continuously performing up-down preneedling, down-up needling and up-down needling, thereby forming physical bridges and providing the desired thickness, binding strength and other desired physical properties. The needle used to perform the needling may be a barb-type needle, having a working blade of about 0.5-3 mm and a needle length (crank outside-to-point distance) of about 70-120 mm. For example, the needle stroke may be about 30-350 times/m$^2$. More specifically, the fineness of the yarn for the nonwoven fabric may be about 1.5-8.0 denier, the thickness of the pile layer may be about 6-13 mm, the needle stroke may be about 120-250 times/m$^2$, and the density of the nonwoven fabric may be about 300-800 g/m$^2$.

The sound absorbing material of the present invention may further contain a thermosetting binder resin in addition to the fiber material.

In particular, the sound absorbing material of the present invention, as used herein, may be a 'binder-impregnated nonwoven fabric' which contains a nonwoven fabric containing an amount of about 30-100 wt % of a heat-resistant fiber based on the total weight of the nonwoven fabric, and a thermosetting binder resin which may be located in the same layer as the nonwoven fabric and may be impregnated in the nonwoven fabric such that three-dimensional shape thereof may be maintained. The thermosetting binder resin, which is impregnated in the nonwoven fabric, may be distributed uniformly on the entire fiber yarn surface of the nonwoven fabric and maintain or further form irregular vent holes or microcavities, thereby maintaining the intrinsic internal three-dimensional structure within the nonwoven fabric.

The term "microcavity" or "microcavities", as used herein, may be a feature formed inside a nonwoven fabric layer and formed by fibers which may be regularly or irregularly arranged inside the nonwoven fabric layer. Further, the microcavities may be formed by any kinds of material inside the nonwoven fabric, whether inherently existed or subsequently added. The microcavities also may be formed by a binder, a resin additive, or the like, without limitation. The microcavities may include any kinds of internal space or vacancy. The microcavities may be open to outside of the nonwoven fabric or be connected therebetween inside the nonwoven fabric layer. The microcavity may be, but not limited to a pore, a hole, a labyrinth, a channel, or the like. Size dimension of the microcavity may vary from several nanometer scale to hundreds micrometer scale, without limitation. In particular, the microcavity may provide a resonance path of sound or noise, and further provide a sound absorbing property. The resonance path of a sound in the microcavities may not be limited to a specific frequency of sound.

The nonwoven fabric may have a structure in which fibers are randomly arranged in three dimensions, although there may be some variations depending on the manufacturing method. Therefore, the inside of the nonwoven fabric may have a very complicated, three-dimensionally interconnected structure, for example, labyrinth structure, which may be formed by regularly or irregularly arranged fibers, may be, rather than bundles of independent capillary tubes. As consequence, the nonwoven fabric formed by needle punching may have irregular vent holes or microcavities formed as the yarns containing the heat-resistant fiber loosely cross one another. When the nonwoven fabric is immersed in a thermosetting hinder resin solution, the binder may be finely and uniformly distributed and attached on the surface of the nonwoven fabric yarns, thereby forming a much finer-sized vent holes or microcavities as compared to before the impregnation. The formation of fine vent holes in the internal structure of the nonwoven fabric may prove an extended resonance path of noise, and thus, may provide substantially improved sound-absorbing performance. When the thermosetting binder resin forms a three-dimensional network structure as it is cured, the sound-absorbing performance may be further improved by forming more and finer vent holes or microcavities inside the nonwoven fabric. Accordingly, since the nonwoven fabric may maintain the intrinsic (original) three-dimensional shape as the thermosetting binder resin is uniformly impregnated into the nonwoven fabric, and additionally, since finer vent holes or microcavities may be formed as the thermosetting binder resin is cured, the sound absorbing and insulating material of the present invention may have remarkably improved sound-absorbing performance due to the maximized noise absorption through the increased resonance of noise in the nonwoven fabric.

The thermosetting binder resin may have entirely different physical and chemical properties when compared with the heat-resistant fiber used as the fiber material in the present invention. When the thermosetting binder resin is impregnated in the nonwoven fabric formed of the thermoplastic heat-resistant fiber, an interfacial layer may be formed through edge-to-edge contact due to the difference in properties and, as a result, the vent holes or microcavities of the nonwoven fabric may remain open. In other words, the thermosetting binder resin impregnated into the nonwoven fabric formed of the heat-resistant fiber may maintain the three-dimensional structure inside the nonwoven fabric.

In addition, the thermosetting binder resin may be curable by light, heat or a curing agent and its shape may not change even under a high-temperature condition. Accordingly, in an exemplary embodiment of the present invention, the shape of the sound absorbing material may be maintained even under a high-temperature condition after molding by employing the heat-resistant fiber and the thermosetting binder resin under specific conditions. As a consequence, when the binder-impregnated nonwoven fabric wherein the thermosetting binder resin is impregnated in the nonwoven fabric formed of a heat-resistant fiber as the sound absorbing material is used, molding into a desired shape may be obtained during the curing of the thermosetting binder resin and the shape may be maintained even under a high-temperature condition.

In particular, the thermosetting binder resin may be an epoxy resin. The epoxy resin, as used herein and in related arts, maybe one of thermosetting binder resins and may be cured into a polymer martial having a three-dimensional network structure. Accordingly, since the epoxy resin may form a network structure and another vent holes or microcavities when cured inside the nonwoven fabric, additional fine vent holes or microcavities may be formed inside the nonwoven fabric and the sound-absorbing performance may be further improved.

The epoxy resin may be one or more epoxy resin selected from the group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphazene diglycidyl ether, bisphenol A novolac epoxy, phenol novolac epoxy resin and o-cresol novolac epoxy resin. The epoxy resin may have an epoxy equivalent of about 70-400. When the epoxy equivalent is less than the predetermined value, for example, less than about 70, intermolecular binding may be substantially reduced to form the three-dimensional network structure or the physical properties of the sound absorbing and insulating material may not be sufficient, because of the reduced adhesion with the heat-resistant fiber. In contrast, when the epoxy equivalent is greater than the predetermined value, for example, greater than about 400, the sound-absorbing performance may be sufficiently obtained because a substantially dense network structure is formed.

When the curing is carried out in the presence of a curing agent, a more and finer complicated three-dimensional network structure may be formed, and thus, the sound-absorbing effect may be further improved. In detail, a three-dimensional network-structured polymer may be formed as the epoxide groups or hydroxyl groups of the epoxy resin react with the functional groups of the curing agent such as amine groups or carboxylic acid groups to form covalent crosslinkages. The curing agent may serve as a catalyst that catalyzes curing reaction and be involved in the reaction and linked to the chemical groups of the epoxy resin. Accordingly, the size and physical properties of the vent holes may be controlled by selecting different curing agents, without limitation.

The thermosetting hinder resin may further contain commonly used additives such as a curing agent and a catalyst and solvents in addition to the epoxy resin. Specifically, the thermosetting binder resin may contain an epoxy resin, an amount of about 1-20 wt % of a curing agent based on the weight of the epoxy resin, an amount of about 1-10 wt % of a catalyst based on the weight of the epoxy resin and an amount of about 10-40 wt % of a flame retardant based on the weight of the epoxy resin. The thermosetting binder resin may serve as a material that binds the fiber material constituting the substantially improved heat-resistant sound absorbing and insulating material and maintains the shape of the substantially improved heat-resistant sound absorbing and insulating material.

As the curing agent, a compound having a functional group that may readily react with the functional groups of the thermosetting binder resin such as epoxide groups or hydroxyl groups may be used. For example, an aliphatic amine, an aromatic amine, an acid anhydride, urea, an amide, imidazole, etc. may be used as the curing agent. As specific examples of the curing agent, one or more selected from the group consisting of diethyltoluenediamine (DETDA), diaminodiphenylsulfone (DDS), boron trifluoride-monoethylamine ($BF_3$.MEA), diaminocyclohexane (DACH), methyltetrahydrophthalic anhydride (MTHPA), methyl-5-norbornene-2,3-dicarboxylic anhydride (NMA), dicyandiamide (Dicy), 2-ethyl-4-methylimidazole may be used. Among those, an aliphatic amine- or amide-based curing agent may be used due to improved crosslinking ability and very superior chemical resistance and weather resistance. In particular, dicyandiamide (Dicy) may be used in consideration of crosslinking ability, flame retardancy, heat resistance, storage stability, processability, and the like. Since dicyandiamide (Dicy) has a high melting point above about 200° C., it may provide superior storage stability after being mixed with the epoxy resin and may ensure sufficient processing time for curing and molding.

As used herein, a catalyst that may facilitate the curing of the thermosetting binder resin used as the binder may be used. The catalyst may be one or more selected from the group consisting of urea, dimethylurea, a tetraphenylborate salt of quaternary DBU, and quaternary phosphonium bromide. The catalyst may be contained in the binder-containing solution.

In addition, various additives, for example, a flame retardant, a heat resistance improver, a water repellent, and the like may be used to provide additional functionalities to the sound absorbing and insulating material. The additive may be contained in the binder solution, and thus, no additional surficial material for providing functionalities to the sound absorbing and insulating material may be required.

The flame retardant may be, but not limited to, a melamine, a phosphate, a metal hydroxide, and the like. For example, the flame retardant may be, but not limited to, one or more selected from the group consisting of melamine, melamine cyanurate, melamine polyphosphate, phosphazene, ammonium polyphosphate, and the like. In particular, the flame retardant may be, but not limited to, melamine, which enhances flame retardancy and heat resistance simultaneously.

The heat resistance improver may be, but not limited to, alumina, silica, talc, clay, glass powder, glass fiber, metal powder, and the like.

And, one or more fluorine-based water repellent may be used as the water repellent. In addition, additives commonly used in the related art may be selected depending on desired purposes. The solvent may be, but not limited to, one or more selected from the group consisting of a ketone, a carbonate, an acetate, a cellosolve, and the like. For example, the solvent may be one or more selected from the group consisting of acetone, methyl ethyl ketone (MEK), methyl isobutyl ketone (MIBK), dimethyl carbonate (DMC), ethyl acetate, butyl acetate, methyl cellosolve, ethyl cellosolve, and butyl cellosolve.

The content of the thermosetting binder resin in the sound absorbing material may be controlled by the compression pressure during the immersion in the binder solution and the temperature during drying. For example, the compression may be performed at a pressure of about 1-20 $kgf/cm^2$ using a commonly used compression roller. As a result, a binder-impregnated nonwoven fabric having a density of about 1,000-3,000 $g/m^2$ may be formed. In particular, the compression may be performed using a compression roller, e.g., a mangle roller, at a pressure of about 5-15 $kgf/cm^2$ to form a binder-impregnated nonwoven fabric having a density of about 1,000-2,000 $g/m^2$. The drying may be performed in an oven at a temperature of about 70-200° C., or particularly of about 100-150° C., for about 1-10 minutes.

The content of the thermosetting binder resin in the sound absorbing material may determine the size, shape and distribution of the vent holes inside the sound absorbing and insulating material. Accordingly, the sound-absorbing property and mechanical property of the sound absorbing and insulating material may be controlled therewith. Particularly, the compressed and dried binder-impregnated nonwoven fabric may contain an amount of about 1-300 parts by weight, or particularly of about 30-150 parts by weight, of the thermosetting binder resin based on 100 parts by weight of the nonwoven fabric material.

Figure 2A:
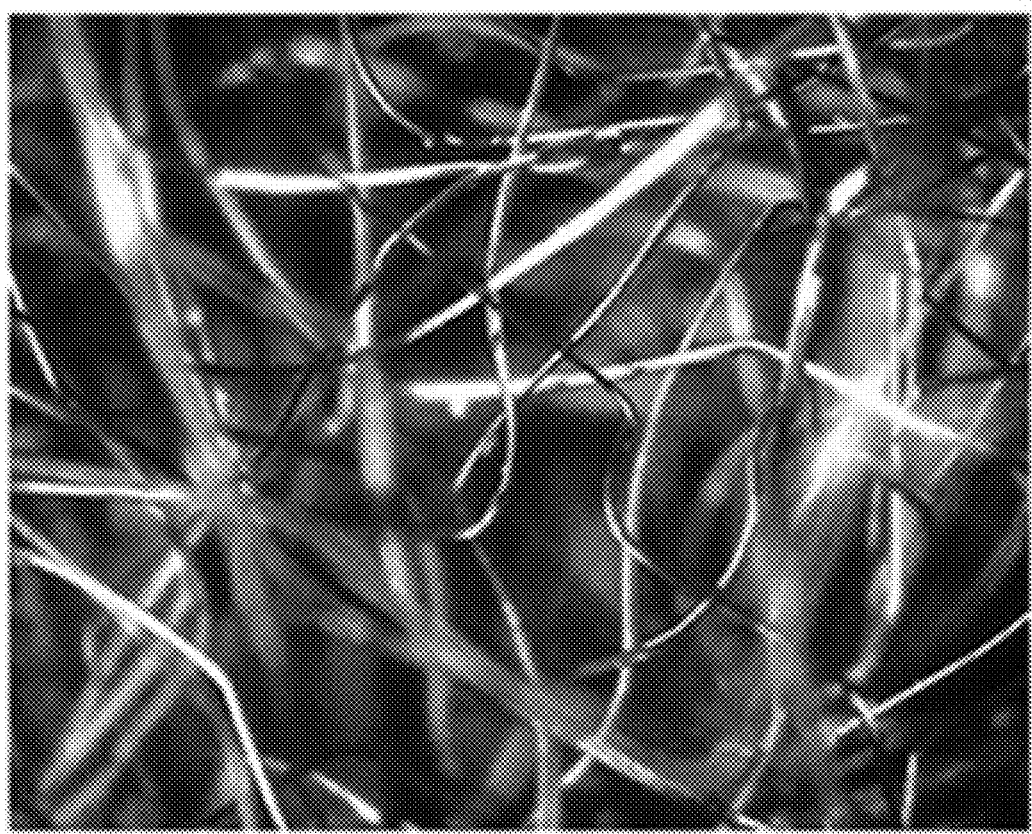
FIGS. 2A-2C show exemplary electron microscopic images (×300) of nonwoven fabrics before and after impregnation of an exemplary thermosetting binder resin.
Figure 2B:
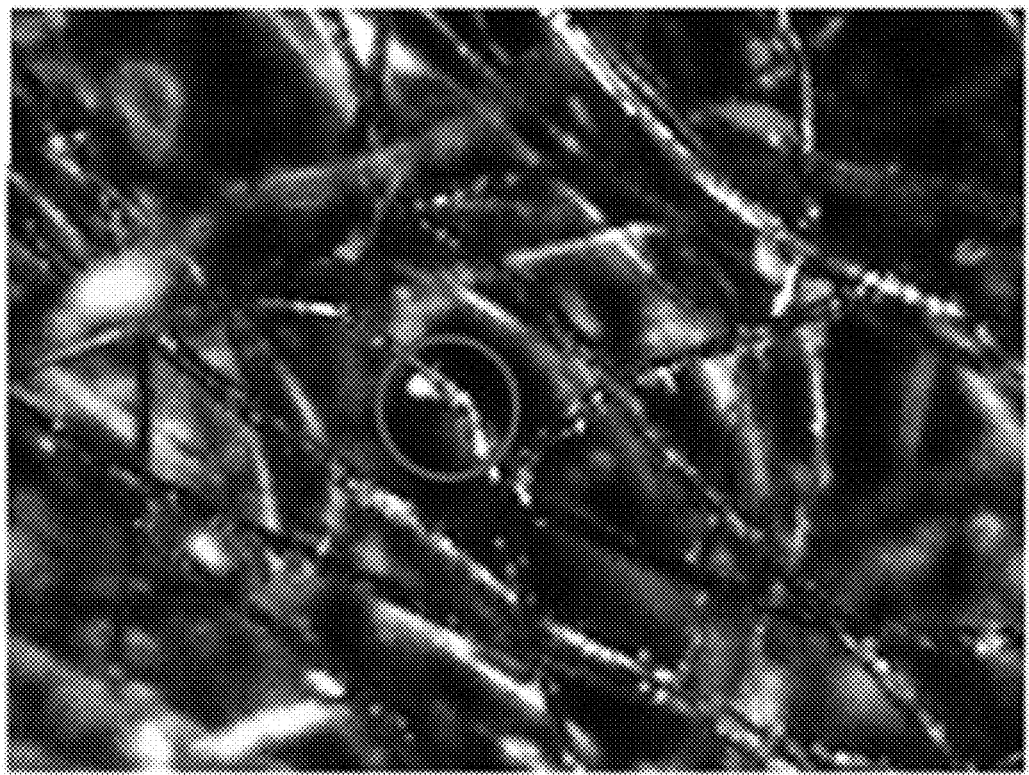

FIGS. 2A-2B show electron microscopic images showing the three-dimensional shape of exemplary nonwovens fabric before and after impregnation of a thermosetting binder resin.

Figure 2C:
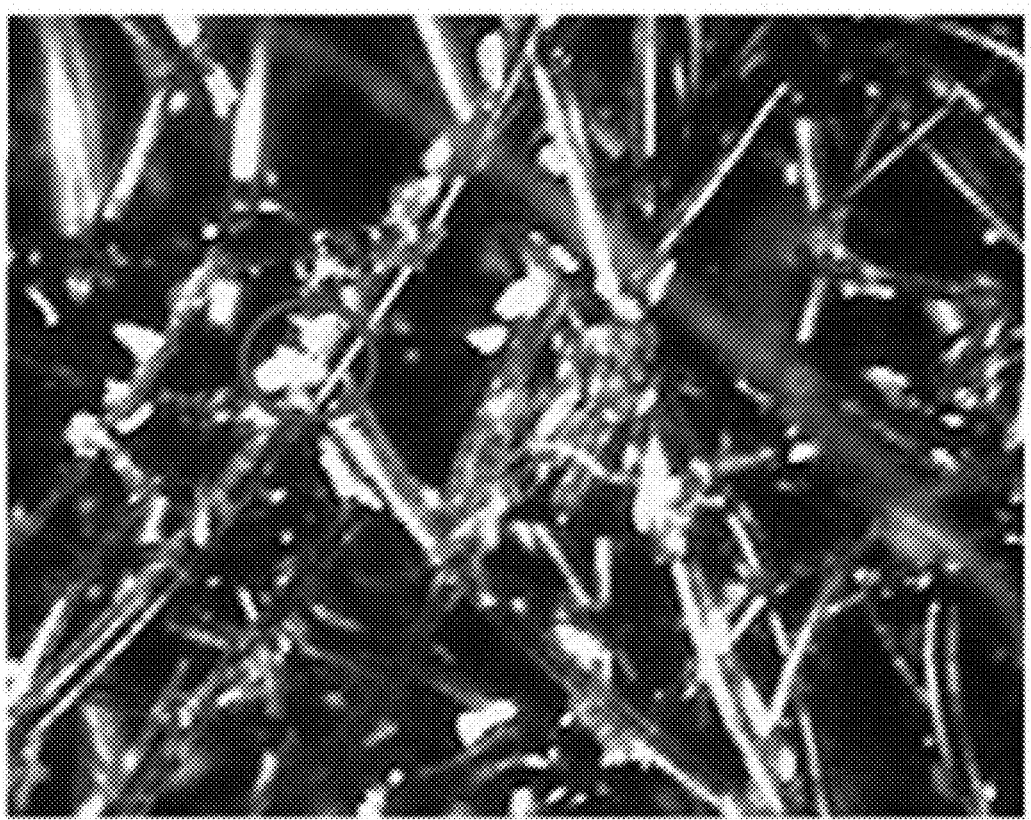

FIG. 2A is an electron microscopic image showing the internal structure of a nonwoven fabric before impregnation of a thermosetting binder resin. It can be seen that heat-resistant fiber yarns cross each other to form irregular vent holes. FIG. 2B and FIG. 2C are electron microscopic images showing the internal structure of the nonwoven fabric after impregnation of a thermosetting binder resin. It can be seen that the binder is finely and uniformly distributed and attached to the heat-resistant fiber yarns and that the content of the binder on the yarn surface increases as the content of the binder increases.

As can be seen from the electron microscopic images of FIGS. 2A-2C, in the sound absorbing and insulating material of the present invention, the thermosetting binder resin is uniformly distributed on the surface of the heat-resistant fiber yarns constituting the nonwoven fabric.

In the cold compression step S105, the substantially improved heat-resistant sound absorbing material the shape of which is fixed in the hot compression molding step S103 is installed on a cold die coupled with one selected from the group consisting of a cold press and a compression jig and then cold compression is performed for about 5 seconds or longer with the surface temperature of the cold die maintained at about 20-40° C. In this step, the shape of the substantially improved heat-resistant sound absorbing and insulating material which has been loosely fixed in the hot compression molding step S103 is stabilized. It costs a lot to maintain the surface temperature of the cold die at about 20° C. or less. And, when the surface temperature of the cold die is above about 40° C., the rigidity of the substantially improved heat-resistant sound absorbing and insulating material may decrease. Accordingly, the above-described range is preferred. When the cold compression time is less than about 5 seconds, the shape of the substantially improved heat-resistant sound absorbing and insulating material may not be stabilized completely. Accordingly, to ensure product rigidity and quality stabilization, the cold compression time may be maintained for about 5 seconds or greater, in particular, for about 30-60 seconds.

The present invention also provides a method for reducing noise of a noise generating device, including: i) identifying the three-dimensional shape of a noise generating device; ii) molding a sound absorbing and insulating material by the method so as to correspond partially or entirely to the three-dimensional shape of the device; and iii) bringing the sound absorbing and insulating material adjacent to the noise generating device.

The device may include any noise generating device including a motor, an engine, an exhaust system, and the like. However, the device of the present invention is never limited to the motor, engine and exhaust system. The sound absorbing and insulating material may be manufactured to correspond partially or entirely to the three-dimensional structure of the device. Since the sound absorbing and insulating material of the present invention may be molded during the curing of the thermosetting binder resin, the sound absorbing and insulating material of the present invention may be molded to correspond partially or entirely to the three-dimensional shape of the device.

As used herein, the expression "adjacent" may mean closely attaching the sound-absorbing material to the noise generating device, installing the sound absorbing and insulating material to be spaced apart from the noise generating device or molding the sound absorbing and insulating material as a part of the noise generating device. Further, the expression "adjacent" in the present invention may include installing the sound-absorbing material on a member (e.g., another sound absorbing and insulating material) connected to the noise generating device.

FIGS. 3A-3B and FIGS. 4A-4B schematically show representative examples wherein an exemplary sound absorbing and insulating material of the present invention is applied to an exemplary noise generating device of a vehicle.

Figure 3A:
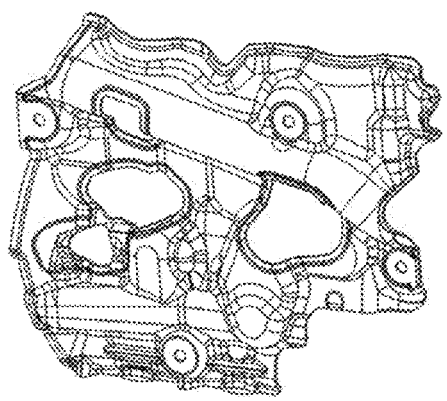
FIGS. 3A-3B schematically show an example wherein an exemplary sound absorbing and insulating material is molded and applied to an exemplary noise generating device of a vehicle.
Figure 3B:
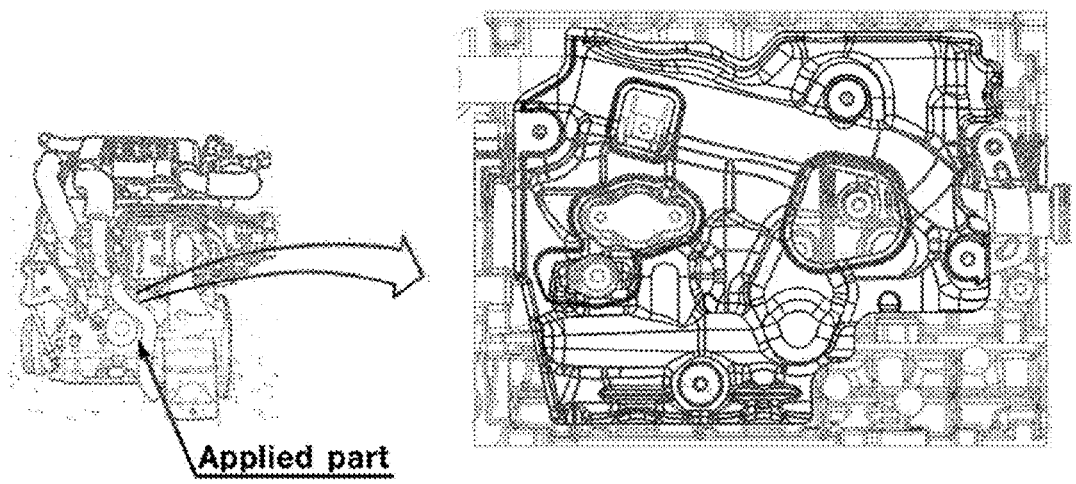

FIGS. 3A-3B schematically show examples wherein the sound absorbing and insulating material is molded and applied as a part of a noise generating device of a vehicle. FIG. 3A shows an image of the sound absorbing and insulating material molded for use in a vehicle engine, and FIG. 3B shows an image of the sound absorbing and insulating material installed on a part of a vehicle engine.

Figure 4A:
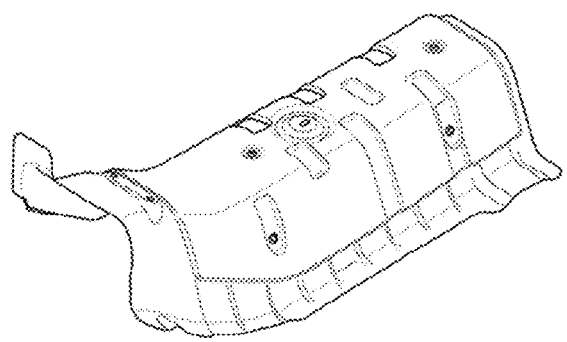
FIGS. 4A-4B schematically show an example wherein an exemplary sound absorbing and insulating material is applied to an exemplary noise generating device of a vehicle to be spaced apart from the noise generating device.
Figure 4B:
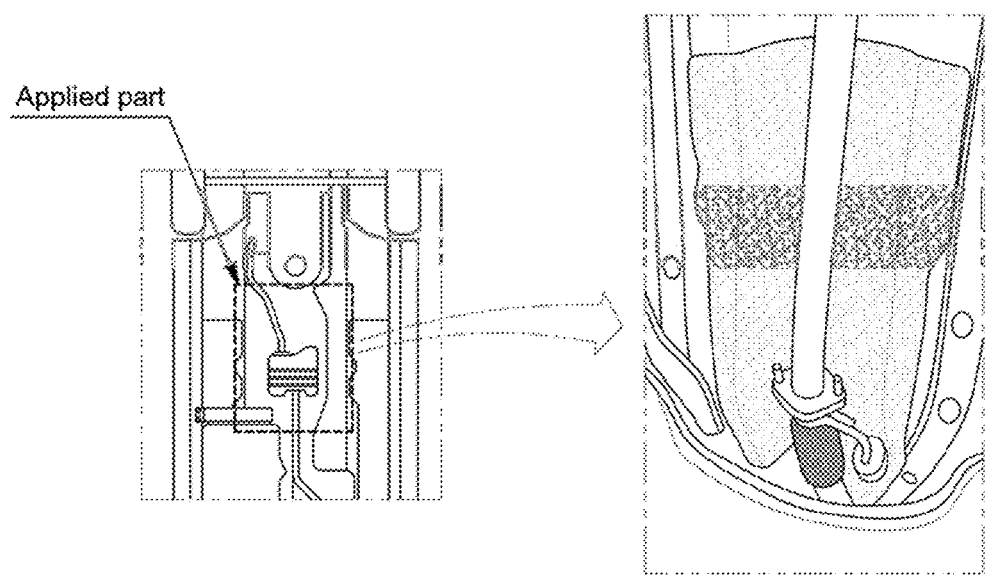

And, FIGS. 4A-4B schematically shows an example wherein an exemplary sound absorbing and insulating material is applied to an exemplary noise generating device of a vehicle to be spaced apart from the noise generating device. FIG. 4A shows an image of the sound absorbing and insulating material molded for use in a lower part of a vehicle, and FIG. 4B shows an image of the sound absorbing and insulating material installed on a lower part of a vehicle.

As described above, since the sound absorbing and insulating material of the present invention has superior sound-absorbing performance, flame retardancy, heat resistance and heat-insulating property, it can exert its inherent sound absorbing and insulating effect when applied to a noise generating device maintained not only at normal temperatures but also at high temperatures of about 200° C. or greater without deformation of the molded product.

EXAMPLES

Hereinafter, a method for preparing a sound absorbing material used to manufacture a substantially improved heat-resistant sound absorbing and insulating material according to various exemplary embodiments of the present invention and a method for molding the sound absorbing and insulating material using the sound absorbing material will be described through preparation examples and examples.

Preparation Examples

Preparation of Sound Absorbing Material

Preparation Example 1

Epoxy Resin-Impregnated Aramid Laminated Sound Absorbing Material

A sound absorbing material was prepared by spraying an epoxy-based thermosetting binder resin onto one side of a sound absorbing material containing, based on the 100 parts of the sound absorbing material, an amount of 67 parts by weight of a meta-aramid (m-aramid) fiber and an amount of 33 parts by weight of an epoxy-based thermosetting binder resin and having a surface density 450 g/m$^2$, to be 30 g/m$^2$, and laminating thereon another sound absorbing material containing, based on 100 parts by weight of the sound absorbing material, an amount of 67 parts by weight of a meta-aramid (m-aramid) fiber and an amount of 33 parts by weight of an epoxy-based thermosetting binder resin and having a surface density of 450 g/m$^2$.

Preparation Example 2

Aramid Nonwoven Fabric Sound Absorbing Material

A meta-aramid short fiber having a limiting oxygen index (LOI) of 40%, a heat resistance temperature of 300° C., a fineness of 2 denier and a length of 51 mm was beaten by air blowing and formed into a web of 30 g/m$^2$ by carding method. The web was stacked by overlapping 10-fold on a conveyor belt operated at 5 m/min using a horizontal wrapper. An aramid nonwoven fabric having a density of 300 g/m$^2$ and a thickness of 6 mm was prepared by continuously performing up-down needling, down-up needling and up-down needling with a needle stroke of 150 times/m$^2$.

Preparation Example 3

Epoxy Resin-Impregnated Aramid Nonwoven Fabric Sound Absorbing Material

The aramid nonwoven fabric prepared in Preparation Example 2 was immersed in a binder solution with 1 dip 1 nip (at pick-up rate of 300%). The binder solution contained an amount of 8 wt % of bisphenol A diglycidyl ether, an amount of 2 wt % of bisphenol A diglycidyl ether polymer, an amount of 0.2 wt % of dicyandiamide, an amount of 0.02 wt % of dimethylurea, an amount of 10 wt % of melamine cyanurate and an amount of 79.78 wt % of dimethyl carbonate, based on the total weight of the binder solution. A binder-impregnated nonwoven fabric of 1,500 g/m$^2$ was prepared by compressing the aramid nonwoven fabric at a pressure of 8 kgf/cm² using a mangle roller. The organic solvent was removed by drying the binder-impregnated nonwoven fabric at a temperature of 150° C. such that 300 g/m² of the binder remained. As a result, a thermosetting felt of 600 g/m² was prepared.

Preparation Example 4

Epoxy Resin-Coated Aramid Nonwoven Fabric Sound Absorbing Material

The aramid nonwoven fabric prepared in Preparation Example 2 was coated with an epoxy resin such that the coating amount of the binder was an amount of 50 parts by weight based on 100 parts by weight of the nonwoven fabric and then dried at a temperature of 150° C.

The coating solution contained an amount of 8 wt % of bisphenol A diglycidyl ether, an amount of 2 wt % of bisphenol A diglycidyl ether polymer, an amount of 0.2 wt % of dicyandiamide, an amount of 0.02 wt % of dimethylurea, an amount of 10 wt % of melamine cyanurate and an amount of 79.78 wt % of dimethyl carbonate, based on the total weight of the coating solution.

Preparation Example 5

Thermoplastic Resin-Impregnated Aramid Nonwoven Fabric Sound Absorbing Material

A thermoplastic resin-impregnated aramid nonwoven fabric was prepared by immersing the aramid nonwoven fabric prepared in Preparation Example 2 in a thermoplastic binder resin solution.

The thermoplastic binder resin solution contained an amount of 10 wt % of polyethylene resin, an amount of 10 wt % of melamine cyanurate and an amount of 80 wt % of dimethyl carbonate (DMC), based on the total weight of the thermoplastic binder resin solution.

Preparation Example 6

Epoxy Resin-Impregnated PET Nonwoven Fabric Sound Absorbing Material

A polyethylene terephthalate (PET) nonwoven fabric having a density of 300 g/m² and a thickness of 6 mm was prepared by needle punching as described in Preparation Example 3, which was then immersed in a binder solution to prepare an epoxy resin-impregnated PET nonwoven fabric.

The binder solution contained an amount of 8 wt % of bisphenol A diglycidyl ether, an amount of 2 wt % of bisphenol A diglycidyl ether polymer, an amount of 0.2 wt % of dicyandiamide, an amount of 0.02 wt % of dimethylurea, an amount of 10 wt % of melamine cyanurate and an amount of 79.78 wt % of dimethyl carbonate, based on the total weight of the binder solution.

Examples

Preparation of Sound Absorbing and Insulating Material

Example 1

A spray-up type releasing agent prepared by diluting a silicon-based emulsion with water to a concentration of 33% was uniformly coated onto top and bottom surfaces inside a heated die in an amount of 60 g/m². Then, the sound absorbing material prepared in Preparation Example 1 was hot compression molded by compressing for 200 seconds at a pressure of 150 kgf/cm² with the surface temperature of the heated die maintained at 195±5° C., thereby fixing the shape of the sound absorbing material. Subsequently, the shape of the sound absorbing material was stabilized by performing cold compression for 60 seconds the surface temperature of a cold die coupled with a compression jig maintained at 30° C. As a result, a substantially improved heat-resistant sound absorbing and insulating material was molded.

Examples 2-6

Substantially improved heat-resistant sound absorbing and insulating materials were molded in the same manner as in Example 1, except that the sound absorbing materials prepared in Preparation Examples 2-6 were used, respectively.

The PET nonwoven fabric of Preparation Example 6 showed thermal deformation due to the reaction heat generated during the epoxy curing process and showed complete thermal deformation during the hot compression molding process. As a result, molding to a desired shape was impossible.

Comparative Example 1

A heat-resistant sound absorbing and insulating material was molded in the same manner as in Example 1, except that the releasing agent was coated onto the top and bottom surfaces inside the heated die in an amount of less than 20 g/m².

Comparative Example 2

A heat-resistant sound absorbing and insulating material was molded in the same manner as in Example 1, except that the releasing agent was coated onto the top and bottom surfaces inside the heated die in an amount exceeding 100 g/m².

Comparative Example 3

A heat-resistant sound absorbing and insulating material was molded in the same manner as in Example 1, except that the surface temperature of the heated die was maintained below 150° C.

Comparative Example 4

A heat-resistant sound absorbing and insulating material was molded in the same manner as in Example 1, except that the surface temperature of the heated die was maintained above 230° C.

The shape of the sound absorbing and insulating materials molded in Example 1 and Comparative Examples 1-4 is shown in FIGS. 5A-5E.

TABLE 1

Figure 5A:
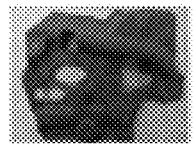
FIGS. 5A-5E show shapes of exemplary sound absorbing and insulating materials.
Figure 5B:
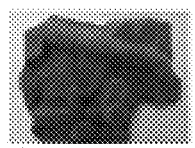
Figure 5C:
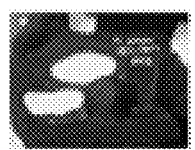
Figure 5D:
Figure 5E:
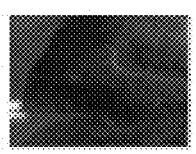

|  | Example 1 | Comparative Example 1 | Comparative Example 2 | Comparative Example 3 | Comparative Example 4 |
|---|---|---|---|---|---|
| Shape | FIG. 5A | FIG. 5B | FIG. 5C | FIG. 5D | FIG. 5E |
| Result | No abnormality | Surface fluffing | Surface whitening | Peeling | Surface browning |

As can be seen from Table 1, the substantially improved heat-resistant sound absorbing and insulating material molded according to the present invention has superior appearance quality.

To evaluate the performance of the substantially improved heat-resistant sound absorbing and insulating material prepared in Example 1, a 3rd gear W.O.T PG test was conducted on a diesel vehicle (U2 1.7). The result is shown in Table 2. Further, a result of measuring noise inside the vehicle under an idle neutral gear is shown in Table 3.

TABLE 2

|  | Product weight (g) | 3rd gear W.O.T 2,000-4,000 rpm AI (%) average | |
|---|---|---|---|
|  |  | Front seat | Back seat |
| Not installed | 0 | 80 | 76 |
| Installed | 66 | 82 | 79.8 |

TABLE 3

|  | Product weight (g) | Neutral gear idle 400-6,300 Hz dB(A) rms | |
|---|---|---|---|
|  |  | Front seat | Back seat |
| Not installed | 0 | 39 | 36.2 |
| Installed | 66 | 37.8 | 35.3 |

As can be seen from Table 2 and Table 3, when the substantially improved heat-resistant sound absorbing and insulating material manufactured by exemplary methods of the present invention was applied, booming noise was improved by 2-3.8% and the noise inside the vehicle was improved by 0.9-1.2 dB(A) when 66 g of the substantially heat-resistant sound absorbing and insulating material was applied.

Test Examples

Evaluation of Physical Properties of Sound Absorbing and Insulating Material

The physical properties of the sound absorbing and insulating materials were measured and compared as follows.

1. Evaluation of Heat Resistance

To evaluate heat resistance, the sound absorbing and insulating material was aged in an oven at a temperature of 260° C. for 300 hours. After keeping at standard state (23±2° C., relative humidity of 50±5%) for at least 1 hour, appearance was inspected and tensile strength was measured. The appearance was visually inspected as to whether there was shrinkage, deformation, surface peeling, fluffing or cracking. The tensile strength was measured for five sheets of randomly selected dumbbell-type No. 1 test specimens at a speed of 200 mm/min under a standard condition.

2. Evaluation of Thermal Cycle

The durability of the sound absorbing and insulating material was evaluated by a thermal cycle test. The durability was determined after performing five cycles.

1) Condition of One Cycle

Room temperature→high temperature (150° C.×3 hr)→room temperature→low temperature (−30° C.×3 hr)→room temperature→humid condition (50° C.×95% RH).

2) Durability Evaluation Standard

After the thermal cycle test, the change in appearance was inspected. For example, surface damage, swelling, breaking and discoloring were inspected. If there was no change in appearance, it was evaluated as 'no abnormality'.

3. Evaluation of Flame Retardancy

The flame retardancy of the sound absorbing and insulating material was measured according to the ISO 3795 flammability test.

4. Evaluation of Nonflammability

The nonflammability of the sound absorbing and insulating material was measured according to the UL94 vertical burn test.

5. Evaluation of Sound-Absorbing Property

The sound-absorbing performance of the sound absorbing and insulating material was measured according to ISO 354.

6. Evaluation of Air Permeability

1) Evaluation Method

The test specimen was mounted on a Frazier-type tester and the amount of air flowing through the test specimen vertically was measured. The area of the test specimen through which air passed was 5 cm$^2$ and the applied pressure was set to 125 pascal (Pa).

Test Example 1

Comparison of Properties of Sound Absorbing and Insulating Materials Depending on Heat-Resistant Fibers In Test Example 1, the physical properties of sound absorbing and insulating materials prepared with different heat-resistant fiber yarns as sound absorbing materials were compared. The epoxy resin-impregnated nonwoven fabrics prepared in Preparation Example 3 were used as the sound absorbing materials. For needle punching, yarns having a fineness of 2 denier and a length of 51 mm were used (see Table 5). Then, the sound absorbing and insulating materials were molded according to the method described in Example 1.

The results of measuring the properties of the sound absorbing and insulating materials prepared with different heat-resistant fibers as the sound absorbing materials are shown in Table 4 and Table 5.

TABLE 4

|  |  | Yarn 1 | Yarn 2 | Yarn 3 | Yarn 4 | Yarn 5 | Yarn 6 | Yarn 7 |
|---|---|---|---|---|---|---|---|---|
| Yarn | Yarn material | Aramid | PPS | PI | PBI | PBO | Oxi-PAN | PK |
|  | Limiting oxygen index | 40 | 30 | 50 | 40 | 60 | 65 | 30 |

TABLE 4-continued

|  |  | Yarn 1 | Yarn 2 | Yarn 3 | Yarn 4 | Yarn 5 | Yarn 6 | Yarn 7 |
|---|---|---|---|---|---|---|---|---|
| Heat resistance | Heat resistance temperature (°C. × 1 hr) | 300 | 230 | 300 | 300 | 300 | 300 | 300 |
|  | Appearance | No abnormality | No abnormality | No abnormality | No abnormality | No abnormality | No abnormality | No abnormality |
|  | Tensile strength (Kgf/cm²) | 200 | 180 | 220 | 200 | 210 | 210 | 200 |
| Thermal cycle | Appearance | No abnormality | No abnormality | No abnormality | No abnormality | No abnormality | No abnormality | No abnormality |
|  | Flame retardancy | Self-extinguishing | Self-extinguishing | Self-extinguishing | Self-extinguishing | Self-extinguishing | Self-extinguishing | Self-extinguishing |
|  | Nonflammability | Non-flammable | Non-flammable | Non-flammable | Non-flammable | Non-flammable | Non-flammable | Non-flammable |

TABLE 5

Sound-absorbing rate

| Frequency (Hz) | Yarn 1 (aramid) | Yarn 2 (PPS) | Yarn 6 (oxi-PAN) | Yarn 7 (PK) |
|---|---|---|---|---|
| 400 | 0.08 | 0.05 | 0.08 | 0.05 |
| 500 | 0.10 | 0.06 | 0.09 | 0.06 |
| 630 | 0.16 | 0.09 | 0.13 | 0.08 |
| 800 | 0.23 | 0.15 | 0.22 | 0.19 |
| 1000 | 0.35 | 0.30 | 0.35 | 0.26 |
| 1250 | 0.44 | 0.39 | 0.45 | 0.37 |
| 1600 | 0.59 | 0.49 | 0.57 | 0.31 |
| 2000 | 0.70 | 0.66 | 0.68 | 0.48 |
| 2500 | 0.79 | 0.71 | 0.80 | 0.67 |
| 3150 | 0.83 | 0.80 | 0.85 | 0.78 |
| 4000 | 0.86 | 0.83 | 0.88 | 0.84 |
| 5000 | 0.99 | 0.95 | 0.92 | 0.83 |
| 6300 | 0.98 | 0.96 | 0.98 | 0.89 |
| 8000 | 0.99 | 0.95 | 0.89 | 0.95 |
| 10000 | 0.98 | 0.97 | 0.99 | 0.95 |

As seen from Table 4 and Table 5, all the sound absorbing and insulating materials prepared using heat-resistant fibers having a limiting oxygen index of 25% or greater and a heat resistance temperature of 150° C. or greater showed satisfactory heat resistance, durability, flame retardancy, non-flammability and sound-absorbing performance. Accordingly, it can be seen that any commonly used heat-resistant fiber may be used as the sound absorbing material constituting the sound absorbing and insulating material of the present invention.

Test Example 2

Comparison of Properties of Sound Absorbing and Insulating Materials Depending on Density of Nonwoven Fabrics In Test Example 2, the physical properties of the sound absorbing and insulating materials depending on the density of nonwoven fabrics were compared. Epoxy resin-impregnated nonwoven fabrics were prepared according to the method of Preparation Example 3 as sound absorbing materials. The density of the nonwoven fabrics was varied in the needle punching step. Then, the sound absorbing and insulating materials were molded according to the method described in Example 1. The sound-absorbing performance of the prepared sound absorbing and insulating materials is shown in FIG. 6.

Figure 6:
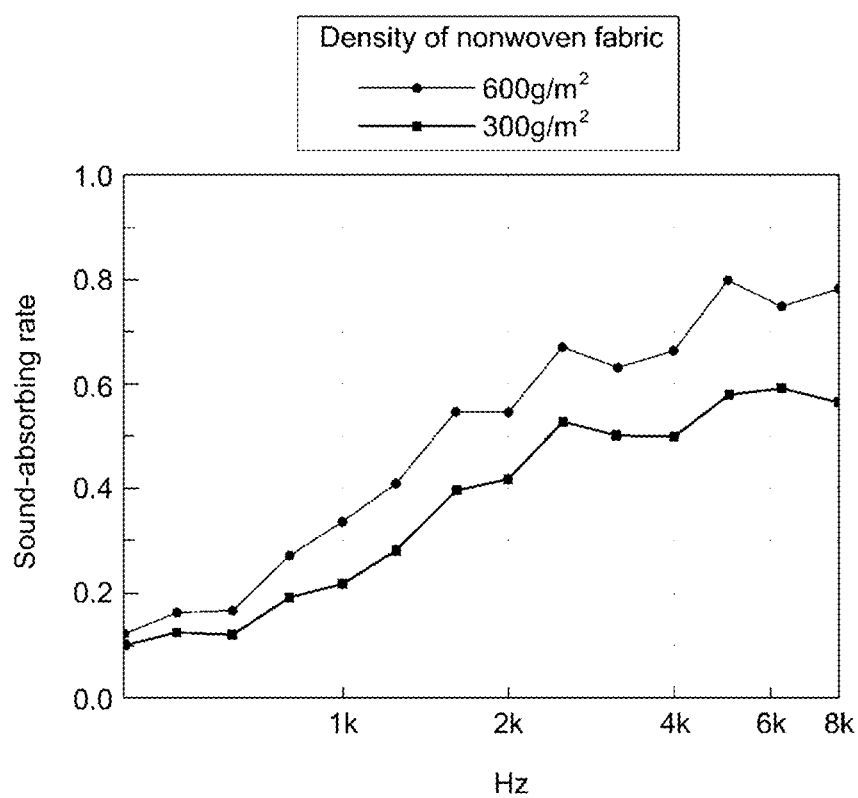
FIG. 6 compares sound-absorbing performance of an exemplary sound absorbing and insulating material depending on the density of a nonwoven fabric.

As seen from FIG. 6, the sound-absorbing performance of the sound absorbing and insulating material was superior when the nonwoven fabric having a density of 600 g/m² was used as compared to when the nonwoven fabric having a density of 300 g/m² was used.

Test Example 3

Evaluation of Sound-Absorbing Performance of Sound Absorbing and Insulating Materials Depending on Binder Application Type In Test Example 3, the sound-absorbing performance of the sound absorbing and insulating materials depending on the application type of the thermosetting binder resin in the nonwoven fabric when preparing the sound absorbing material was compared.

That is to say, the sound-absorbing rate of the sound absorbing and insulating materials prepared by applying the thermosetting binder resin to the nonwoven fabric by impregnation or coating was measured. Table 6 shows the results of measuring the sound-absorbing rate for the sound absorbing and insulating material prepared from a nonwoven fabric (Preparation Example 2), the sound absorbing and insulating material prepared from a thermosetting binder resin-impregnated nonwoven fabric (Preparation Example 3) and the sound absorbing and insulating material prepared from a thermosetting binder resin-coated nonwoven fabric (Preparation Example 4).

TABLE 6

Sound-absorbing rate

| Frequency (Hz) | Preparation Example 2 (nonwoven fabric) | Preparation Example 3 (binder-impregnated nonwoven fabric) | Preparation Example 4 (binder-coated nonwoven fabric) |
|---|---|---|---|
| 400 | 0.01 | 0.08 | 0.02 |
| 500 | 0.03 | 0.10 | 0.03 |
| 630 | 0.12 | 0.16 | 0.05 |
| 800 | 0.16 | 0.23 | 0.08 |
| 1000 | 0.26 | 0.35 | 0.12 |
| 1250 | 0.32 | 0.44 | 0.15 |
| 1600 | 0.39 | 0.59 | 0.22 |
| 2000 | 0.48 | 0.70 | 0.29 |
| 2500 | 0.64 | 0.79 | 0.40 |
| 3150 | 0.63 | 0.83 | 0.57 |
| 4000 | 0.72 | 0.86 | 0.68 |
| 5000 | 0.80 | 0.99 | 0.77 |
| 6300 | 0.78 | 0.98 | 0.82 |
| 8000 | 0.89 | 0.99 | 0.98 |
| 10000 | 0.90 | 0.98 | 0.98 |

As seen from Table 6, the sound absorbing and insulating material of Preparation Example 3 prepared using the thermosetting binder resin-impregnated aramid nonwoven fabric as the sound absorbing material exhibits superior sound-absorbing rate in all frequency ranges as compared to Preparation Example 2 (wherein aramid nonwoven fabric was used as the sound absorbing material). In contrast, the sound absorbing and insulating material of Preparation Example 4 wherein the thermosetting binder resin-coated nonwoven fabric was used exhibits lower sound-absorbing rate in the frequency range of 400-5000 Hz as compared to Preparation Example 2.

Test Example 4

Evaluation of Heat-Insulating Performance of Binder-Impregnated Sound Absorbing and Insulating Materials In Test Example 4, the heat-insulating performance of the sound absorbing and insulating materials prepared in Example 2 (wherein the aramid nonwoven fabric was used as the sound absorbing material) and Example 3 (wherein the thermosetting binder resin-impregnated aramid nonwoven fabric was used as the sound absorbing material) was evaluated. After applying heat of 1000° C. from one side of a 25-mm thick sound absorbing and insulating material sample for 5 minutes, temperature was measured on the opposite side of the sample.

The temperature measured on the opposite side of the sound absorbing and insulating material was 250° C. for Example 2 and 350° C. for Example 3. Accordingly, it can be seen that use of the thermosetting binder resin-impregnated fiber material as the sound absorbing material provides improved heat-insulating performance.

These results show that the sound absorbing and insulating material of the present invention has very superior heat-insulating property.

Test Example 5

Comparison of Heat-Insulating Performance with Aluminum Heat-Insulating Plate

In Test Example 5, the heat-insulating performance of the sound absorbing and insulating material of Example 2 was compared with that of an aluminum heat-insulating plate. While applying the same heat from one side of the sound absorbing and insulating material and the heat-insulating plate at a temperature of 250° C., the temperature at the opposite side was measured with time. The results are shown in FIG. 7.

Figure 7:
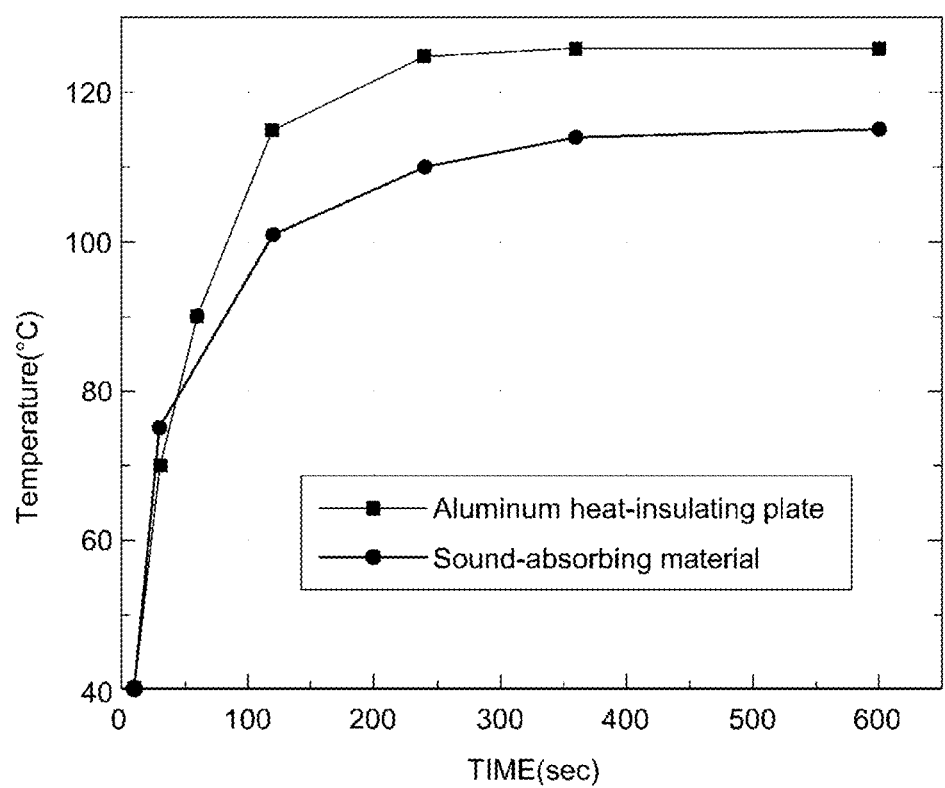
FIG. 7 compares the heat-insulating performance of an exemplary sound absorbing and insulating material manufactured according to an exemplary method for molding a substantially improved heat-resistant sound absorbing and insulating material according to an exemplary embodiment of the present invention with that of an existing aluminum heat-insulating plate.

As seen from FIG. 7, the sound absorbing and insulating material according to the present invention exhibited better heat-insulating performance by 11° C. or greater as compared to the aluminum heat-insulating plate.

Test Example 6

Comparison of Properties of Sound Absorbing and Insulating Materials Depending on Thermosetting Binder Resin Content Sound absorbing materials were prepared as described in Preparation Example 2. The epoxy resin-impregnated aramid nonwoven fabric was dried to have different contents of the thermosetting binder resin. The thermosetting binder resin content was represented as parts by weight of the binder included in the sound absorbing and insulating material based on 100 parts by weight of the dried nonwoven fabric.

The results of comparing the mechanical properties and sound-absorbing rate of the sound absorbing and insulating materials of prepared with different thermosetting binder resin contents are shown in Table 7 and Table 8.

TABLE 7

| | Physical properties of sound absorbing and insulating materials with different binder contents | | | | |
|---|---|---|---|---|---|
| Binder content (parts by weight) | 0 | 10 | 50 | 100 | 200 |
| Air permeability (mL/cm² · s) | 500 | 380 | 350 | 320 | 210 |
| Tensile strength (kg/cm²) | 40 | 60 | 200 | 240 | 310 |
| Flammability | Non-flammable | Non-flammable | Non-flammable | Non-flammable | Non-flammable |

TABLE 8

| | Sound-absorbing rate of sound absorbing and insulating materials with different binder contents | | | | |
|---|---|---|---|---|---|
| Frequency (Hz) | 0 part by weight | 10 parts by weight | 50 parts by weight | 100 parts by weight | 200 parts by weight |
| 400 | 0.01 | 0.01 | 0.08 | 0.06 | 0.02 |
| 500 | 0.03 | 0.04 | 0.10 | 0.09 | 0.04 |
| 630 | 0.12 | 0.14 | 0.16 | 0.15 | 0.09 |
| 800 | 0.16 | 0.17 | 0.23 | 0.25 | 0.11 |
| 1000 | 0.26 | 0.26 | 0.35 | 0.30 | 0.14 |
| 1250 | 0.32 | 0.34 | 0.44 | 0.42 | 0.17 |
| 1600 | 0.39 | 0.41 | 0.59 | 0.54 | 0.22 |
| 2000 | 0.48 | 0.55 | 0.70 | 0.58 | 0.35 |
| 2500 | 0.64 | 0.68 | 0.79 | 0.67 | 0.44 |
| 3150 | 0.63 | 0.69 | 0.83 | 0.72 | 0.52 |
| 4000 | 0.72 | 0.77 | 0.86 | 0.75 | 0.53 |
| 5000 | 0.80 | 0.83 | 0.99 | 0.79 | 0.57 |
| 6300 | 0.78 | 0.88 | 0.98 | 0.80 | 0.63 |
| 8000 | 0.89 | 0.91 | 0.99 | 0.90 | 0.70 |
| 10000 | 0.90 | 0.92 | 0.98 | 0.92 | 0.71 |

From Table 7 and Table 8, it can be seen that the impregnation of the thermosetting binder resin in the nonwoven fabric which is used as the sound absorbing material provides improved sound-absorbing rate. In addition, it can be seen that the sound-absorbing rate of the sound absorbing and insulating material may be controlled with the content of the thermosetting binder resin.

Test Example 7

Comparison of Properties of Sound Absorbing and Insulating Materials Depending on Types of Binders Sound absorbing and insulating materials wherein an amount of 50 parts by weight of a binder was impregnated based on 100 parts by weight of an aramid nonwoven fabric were prepared according to the method of Preparation Example 3. The resins described in Table 9 were used as the binder.

The results of comparing the mechanical properties and sound-absorbing rate of the sound absorbing and insulating materials prepared with different binders are shown in Table 9.

TABLE 9

Sound-absorbing rate of sound absorbing and insulating materials with different binders

| Binder resin | Epoxy | Phenol | Urea | Melamine | Polyurethane |
|---|---|---|---|---|---|
| Heat resistance temperature (° C. × 1 hr) | 300 | 260 | 190 | 300 | 200 |
| Tensile strength (kg/cm$^2$) | 200 | 165 | 180 | 180 | 170 |
| Flame retardancy | Self-extinguishing | Self-extinguishing | Self-extinguishing | Self-extinguishing | Self-extinguishing |
| Flammability | Non-flammable | Non-flammable | Non-flammable | Non-flammable | Non-flammable |

What is claimed is:

1. A method for molding a heat-resistant sound absorbing and insulating material, comprising:
   i) coating a releasing agent inside a heated die;
   ii) forming a shape of a sound absorbing material by installing a sound absorbing material comprising, based on 100 parts by weight of sound absorbing material, a) an amount of about 20-80 parts by weight of a fiber material having a limiting oxygen index (LOI) of about 25% or greater and a heat resistance temperature of about 200° C. or greater and b) an amount of about 20-80 parts by weight of a thermosetting binder resin having a heat resistance temperature of about 200° C. or greater on the heated die coated with the releasing agent; and
   iii) stabilizing the shape of the compressed sound absorbing material,
   wherein the thermosetting binder resin comprises an epoxy resin, an amount of about 1-20 wt % of a curing agent based on the weight of the epoxy resin, an amount of about 1-10 wt % of a catalyst based on the weight of the epoxy resin and an amount of about 10-40 wt % of a flame retardant based on the weight of the epoxy resin.

2. The method of claim 1, wherein a releasing agent is prepared by diluting an emulsion with water to a concentration of about 10-90% (vol/vol) and is uniformly coated onto top and bottom surfaces inside the heated die in an amount of about 20-100 g/m$^2$.

3. The method of claim 2, wherein the emulsion is one or more selected from the group consisting of a silicon-based emulsion and a fluorine-based emulsion.

4. The method of claim 1, wherein the sound absorbing material is installed on the heated die coupled with a heated press and heated compression is performed at a pressure of about 60-200 kgf/cm$^2$ for about 60-300 seconds with the surface temperature of the heated die maintained at about 150-230° C. to fix its shape.

5. The method of claim 1, wherein the sound absorbing material comprises a nonwoven fabric comprising a fiber material and a thermosetting binder resin which is located in the same layer as the nonwoven fabric and is impregnated in the nonwoven while maintaining a three-dimensional structure inside the nonwoven fabric, the thermosetting binder resin being distributed uniformly on the entire fiber yarn of the nonwoven fabric and forming smaller-sized vent holes or microcavities as compared to before the impregnation of the binder.

6. The method of claim 5, wherein the sound absorbing material is prepared by immersing the nonwoven fabric in a thermosetting binder resin solution, compressing at a pressure of about 1-20 kgf/cm$^2$ and then drying at about 70-200° C.

7. The method of claim 6, wherein the sound absorbing material comprises an amount of about 1-300 parts by weight of the thermosetting binder resin impregnated, based on 100 parts by weight of the nonwoven fabric.

8. The method of claim 5, wherein the fiber material is one or more selected from an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

9. The method of claim 5, wherein the fiber material is one or more selected from the group consisting of a meta-aramid (m-aramid) fiber and a para-aramid (p-aramid) fiber.

10. The method of claim 5, wherein the nonwoven fabric is a single-layer nonwoven fabric formed of an aramid fiber having a fineness of about 1-15 denier and a thickness of about 3-20 mm.

11. The method of claim 5, wherein the nonwoven fabric has a density of about 100-2000 g/m$^2$.

12. The method of claim 1, wherein the epoxy resin comprises one or more selected from the group consisting of bisphenol A diglycidyl ether, bisphenol F diglycidyl ether, polyoxypropylene diglycidyl ether, phosphazene diglycidyl ether, phenol novolac epoxy, o-cresol novolac epoxy and bisphenol A novolac epoxy.

13. The method of claim 1, wherein, in the step iii), the sound absorbing material is installed on a cold die coupled with one selected from the group consisting of a cold press and a compression jig and cold compression is performed for about 5 seconds or greater with the surface temperature of the cold die maintained at a about 20-40° C.

14. The method of claim 1, wherein, in the step iii), the shape of the compressed sound absorbing material is stabilized for about 30-60 seconds.

15. A method for reducing noise of a noise generating device, comprising:
   i) identifying the three-dimensional shape of a noise generating device;
   ii) molding a sound absorbing and insulating material by the method of claim 1 so as to correspond partially or entirely to the three-dimensional shape of the device; and
   iii) bringing the sound absorbing and insulating material adjacent to the noise generating device.

16. The method of claim 15, wherein the device is a motor, an engine or an exhaust system.

17. The method for reducing noise of a noise generating device according to claim 15, wherein said bringing the sound absorbing and insulating material adjacent to the noise generating device comprises closely attaching the sound absorbing and insulating material to the noise generating device, installing the sound absorbing and insulating material to be spaced apart from the noise generating device or molding the sound absorbing and insulating material as a part of the noise generating device.

18. A vehicle part that comprises a heat-resistant sound absorbing and insulating material manufactured by a method of claim 1.

* * * * *